(12) United States Patent
Yamaizumi

(10) Patent No.: US 10,382,439 B2
(45) Date of Patent: Aug. 13, 2019

(54) INFORMATION PROCESSING SYSTEM, INFORMATION PROCESSING APPARATUS, INFORMATION PROCESSING METHOD, AND STORAGE MEDIUM

(71) Applicant: FUJI XEROX CO., LTD., Tokyo (JP)

(72) Inventor: Wataru Yamaizumi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 212 days.

(21) Appl. No.: 15/219,880

(22) Filed: Jul. 26, 2016

(65) Prior Publication Data

US 2017/0272438 A1 Sep. 21, 2017

(30) Foreign Application Priority Data

Mar. 18, 2016 (JP) .................................. 2016-054709

(51) Int. Cl.
*H04L 29/06* (2006.01)
(52) U.S. Cl.
CPC .................................. *H04L 63/10* (2013.01)
(58) Field of Classification Search
CPC ...................................................... H04L 63/10
USPC ............................................................. 726/4
See application file for complete search history.

(56) References Cited

U.S. PATENT DOCUMENTS

| | | | | |
|---|---|---|---|---|
| 8,793,509 B1* | 7/2014 | Nelson | .................. | G06F 21/335 380/227 |
| 2004/0139028 A1* | 7/2004 | Fishman | .............. | G06Q 20/341 705/67 |
| 2006/0288410 A1* | 12/2006 | Kim | ........................ | G06F 21/31 726/18 |
| 2011/0092185 A1* | 4/2011 | Garskof | .................. | G06F 21/35 455/411 |
| 2012/0316963 A1* | 12/2012 | Moshfeghi | ............. | G06Q 20/20 705/14.58 |
| 2013/0276066 A1* | 10/2013 | Buehl | .................... | G06F 21/335 726/4 |
| 2014/0189799 A1* | 7/2014 | Lu | ........................... | H04L 63/08 726/4 |
| 2014/0230020 A1* | 8/2014 | Mogaki | .................. | H04L 63/10 726/4 |
| 2015/0032627 A1* | 1/2015 | Dill | ....................... | G06Q 20/385 705/44 |

(Continued)

FOREIGN PATENT DOCUMENTS

JP        2006-185227 A        7/2006

*Primary Examiner* — Harunur Rashid
*Assistant Examiner* — Sakinah White Taylor
(74) *Attorney, Agent, or Firm* — Oliff PLC

(57) ABSTRACT

An information processing system includes a memory that stores a user and authorization information, indicative of processing permitted for the user to execute with respect to a server on a communication line, in an associated manner; a generating unit that generates second authorization information on the basis of first authorization information associated with a user who uses a first device; a transmitting unit that transmits the second authorization information to a second device located near the first device; a receiving unit that receives data and the second authorization information from the second device; and a requesting unit that requests the server to execute processing using the data, on the basis of the second authorization information.

8 Claims, 14 Drawing Sheets

(56) References Cited

U.S. PATENT DOCUMENTS

| | | | |
|---|---|---|---|
| 2015/0222615 A1* | 8/2015 | Allain | H04L 63/08 |
| | | | 726/4 |
| 2017/0034172 A1* | 2/2017 | Biggs | H04L 63/08 |
| 2017/0076366 A1* | 3/2017 | Wadley | G06Q 40/02 |
| 2017/0221059 A1* | 8/2017 | Sethi | G06F 21/44 |
| 2018/0192103 A1* | 7/2018 | Tanaka | H04N 21/25 |

* cited by examiner

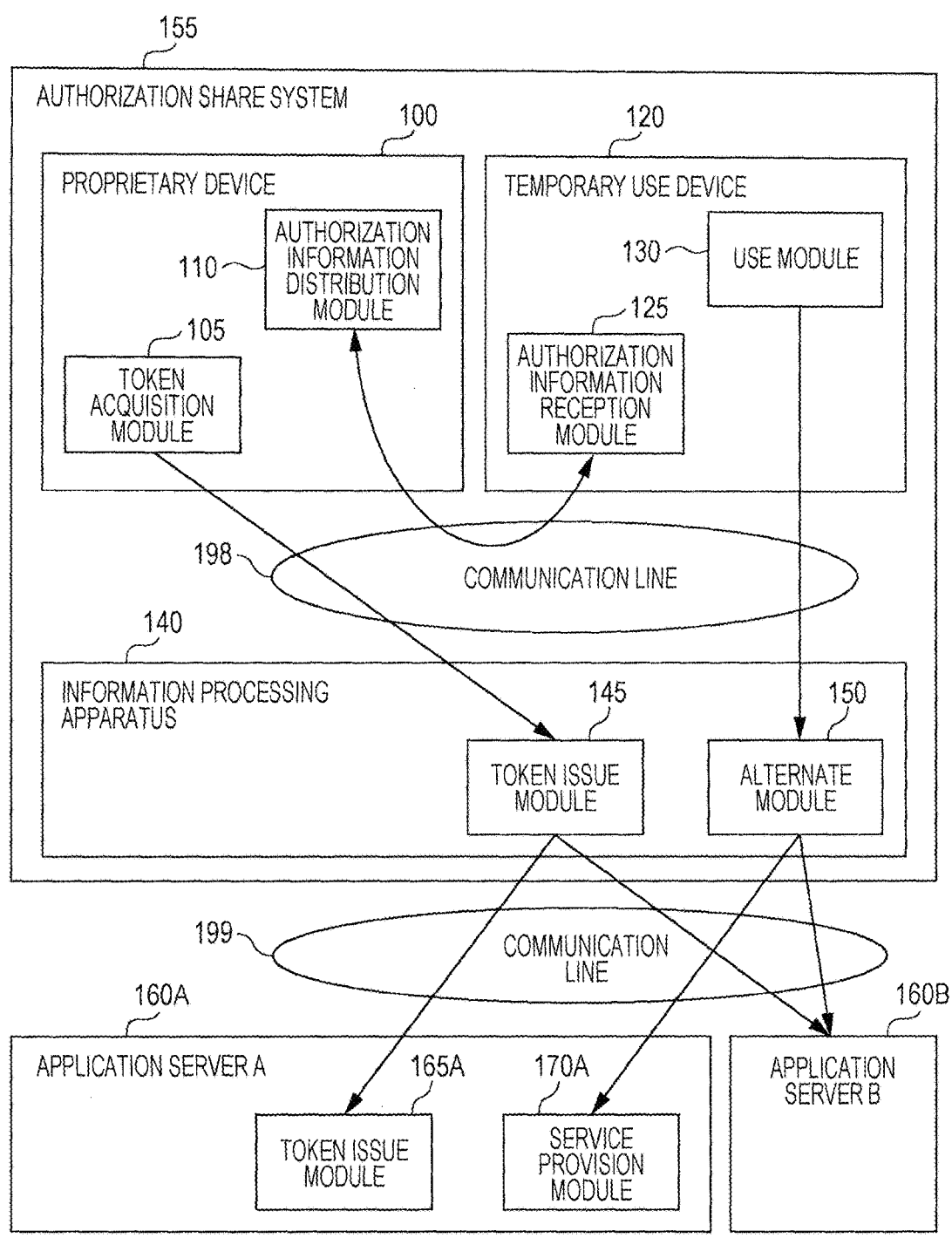

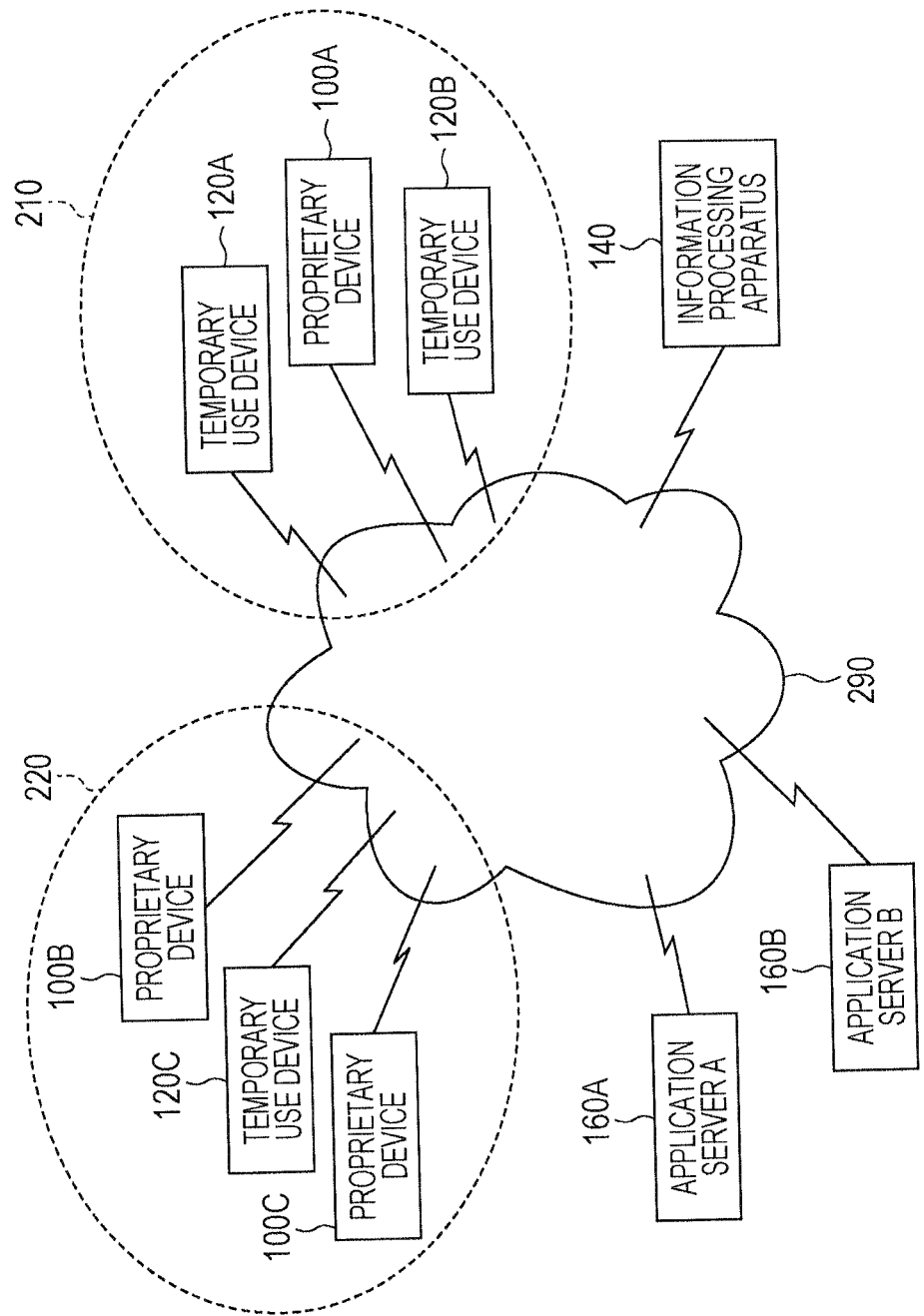

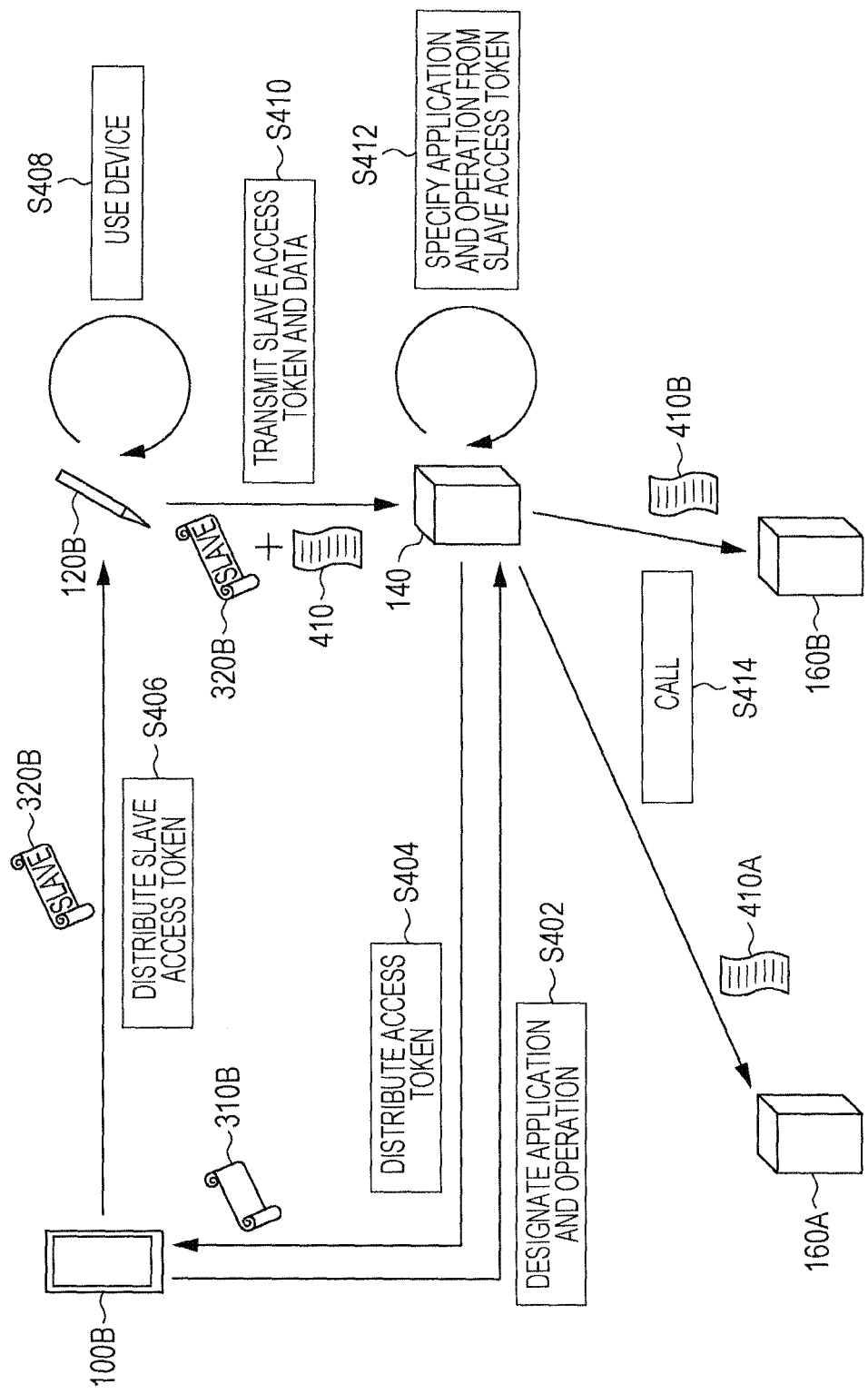

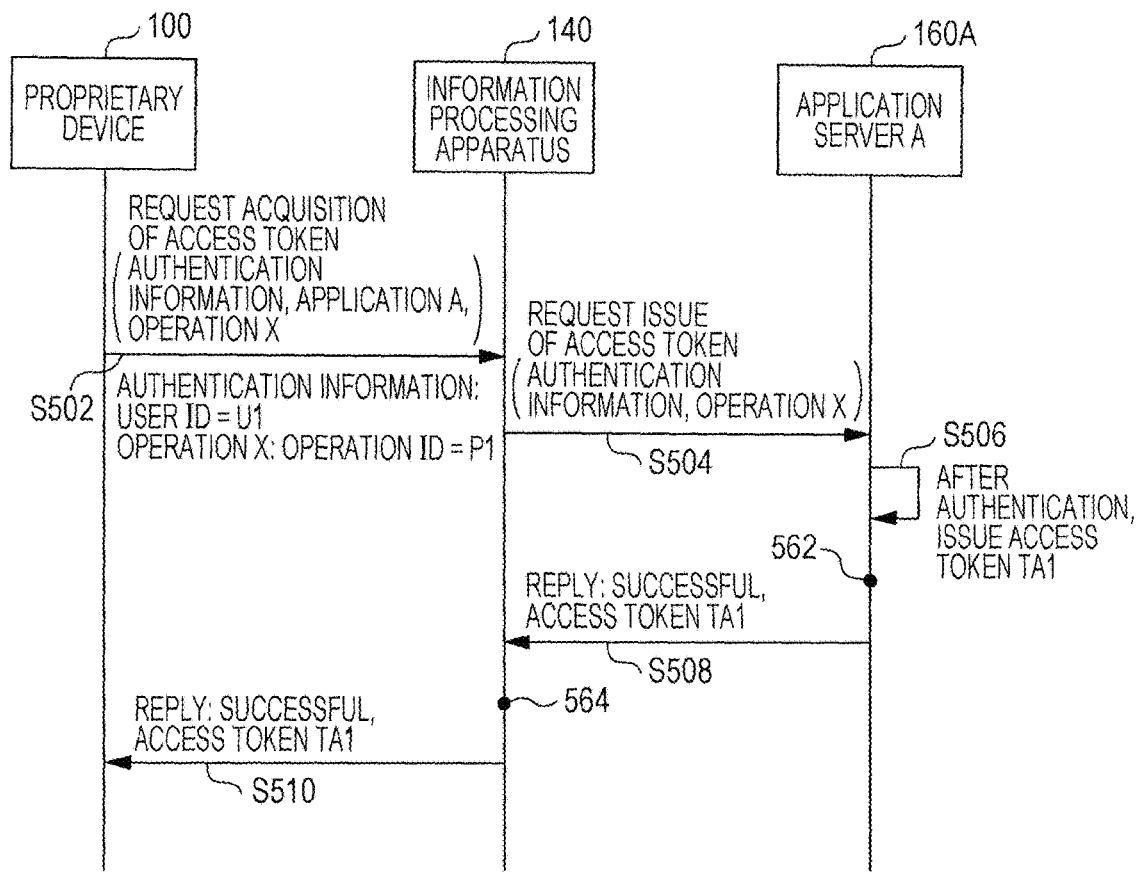

| ACCESS TOKEN ID /710 | APPLICATION /720 | USER ID /730 | OPERATION ID /740 | ISSUE DATE AND TIME /750 |
|---|---|---|---|---|
| TA1 | A | U1 | P1 | 20XX-10-01T10:00:00 |

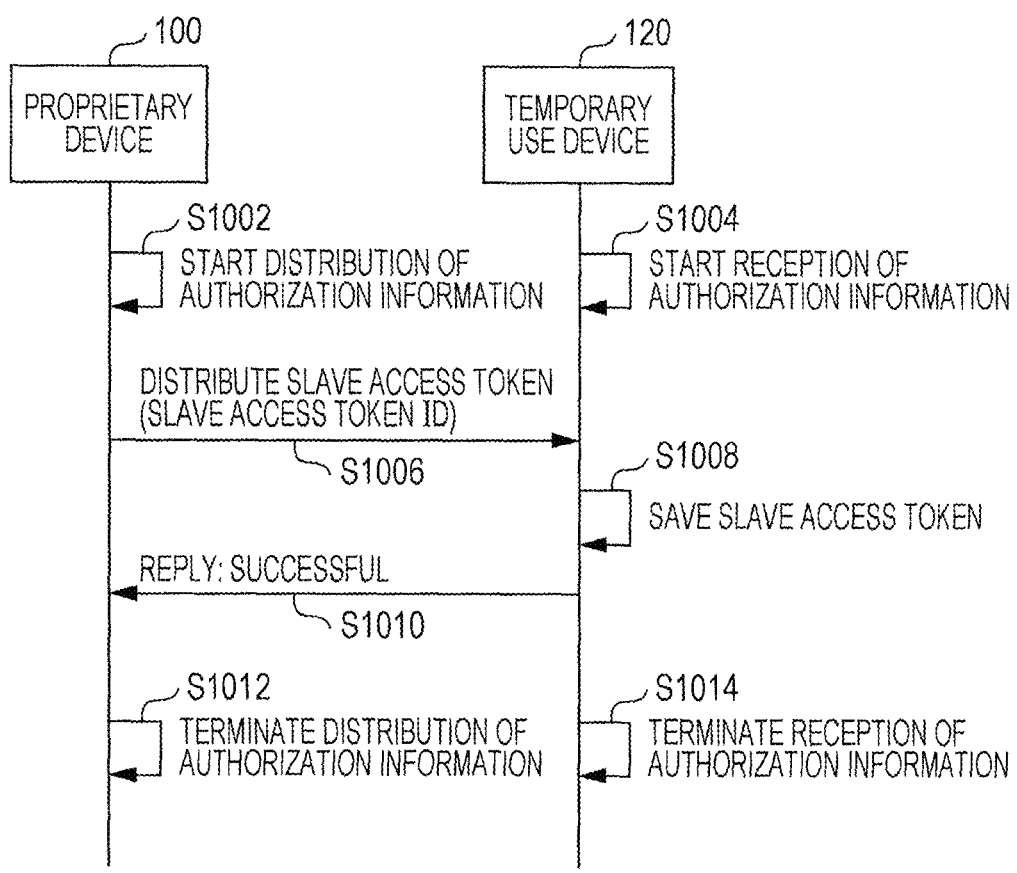

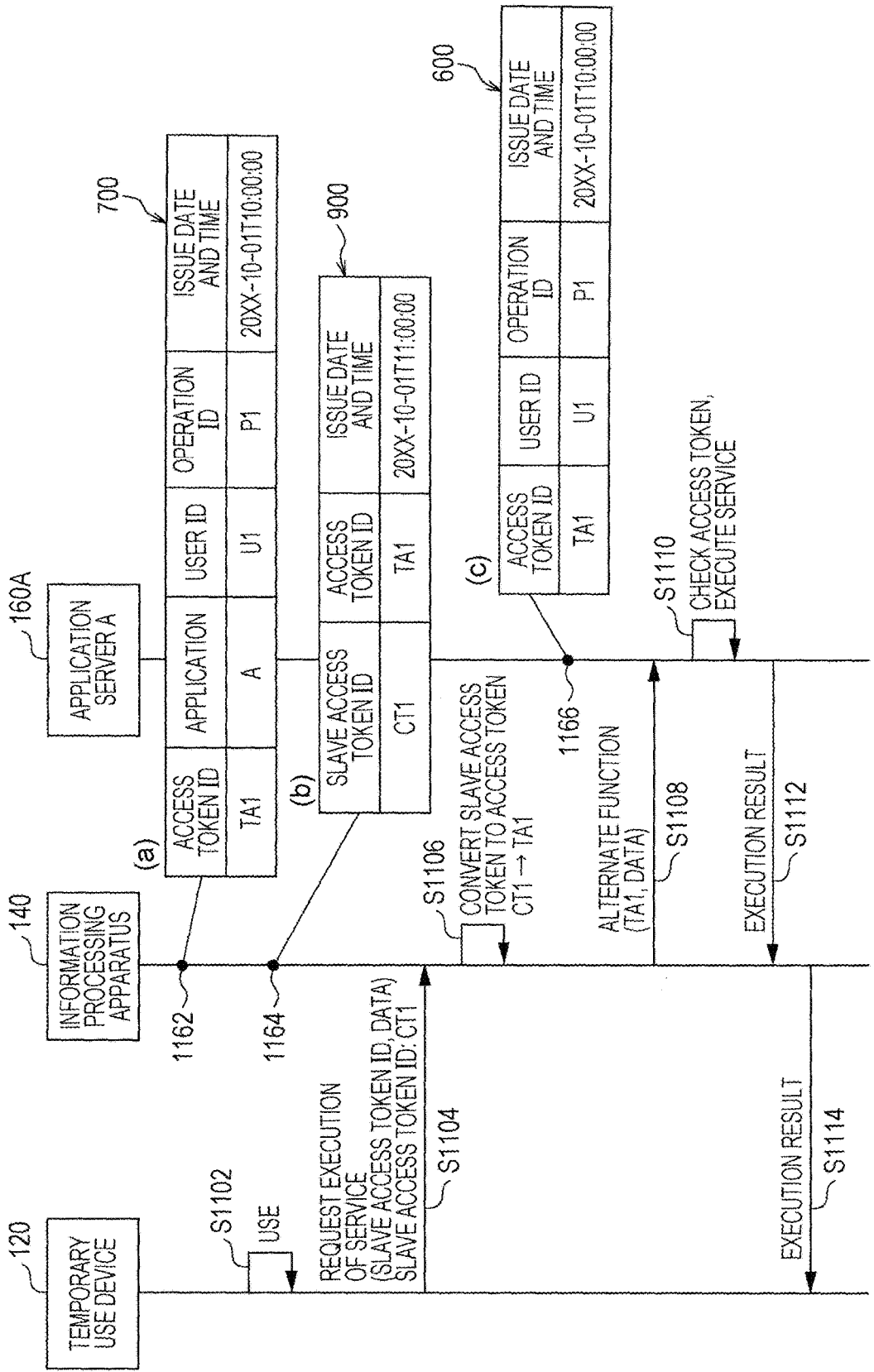

| SOFTWARE | ACCESS TOKEN ID | SLAVE ACCESS TOKEN ID |
|---|---|---|
| STORAGE S | TA1 | CT1 |

INFORMATION PROCESSING SYSTEM, INFORMATION PROCESSING APPARATUS, INFORMATION PROCESSING METHOD, AND STORAGE MEDIUM

CROSS-REFERENCE TO RELATED APPLICATIONS

This application is based on and claims priority under 35 USC 119 from Japanese Patent Application No. 2016-054709 filed Mar. 18, 2016.

BACKGROUND

The present invention relates to an information processing system, an information processing apparatus, an information processing method, and a storage medium.

SUMMARY

According to an aspect of the invention, there is provided an information processing system including a memory that stores a user and authorization information, indicative of processing permitted for the user to execute with respect to a server on a communication line, in an associated manner; a generating unit that generates second authorization information on the basis of first authorization information associated with a user who uses a first device; a transmitting unit that transmits the second authorization information to a second device located near the first device; a receiving unit that receives data and the second authorization information from the second device; and a requesting unit that requests the server to execute processing using the data, on the basis of the second authorization information.

BRIEF DESCRIPTION OF THE DRAWINGS

Exemplary embodiments of the present invention will be described in detail based on the following figures, wherein:

FIG. 1 is a conceptual module configuration diagram for a configuration example of a first exemplary embodiment;

FIG. 2 is an explanatory illustration showing a system configuration example in which this exemplary embodiment is used;

FIG. 4 is an explanatory illustration showing a processing example according to the first exemplary embodiment;

FIG. 5 is a flowchart showing a processing example according to the first exemplary embodiment;

FIG. 6 is an explanatory illustration showing a data structure example of an access token management table;

FIG. 9 is an explanatory illustration showing a data structure example of a slave access token management table;

FIG. 10 is a flowchart showing a processing example according to the first exemplary embodiment;

FIG. 11 is a flowchart showing a processing example according to the first exemplary embodiment;

DETAILED DESCRIPTION

Figure 3A:
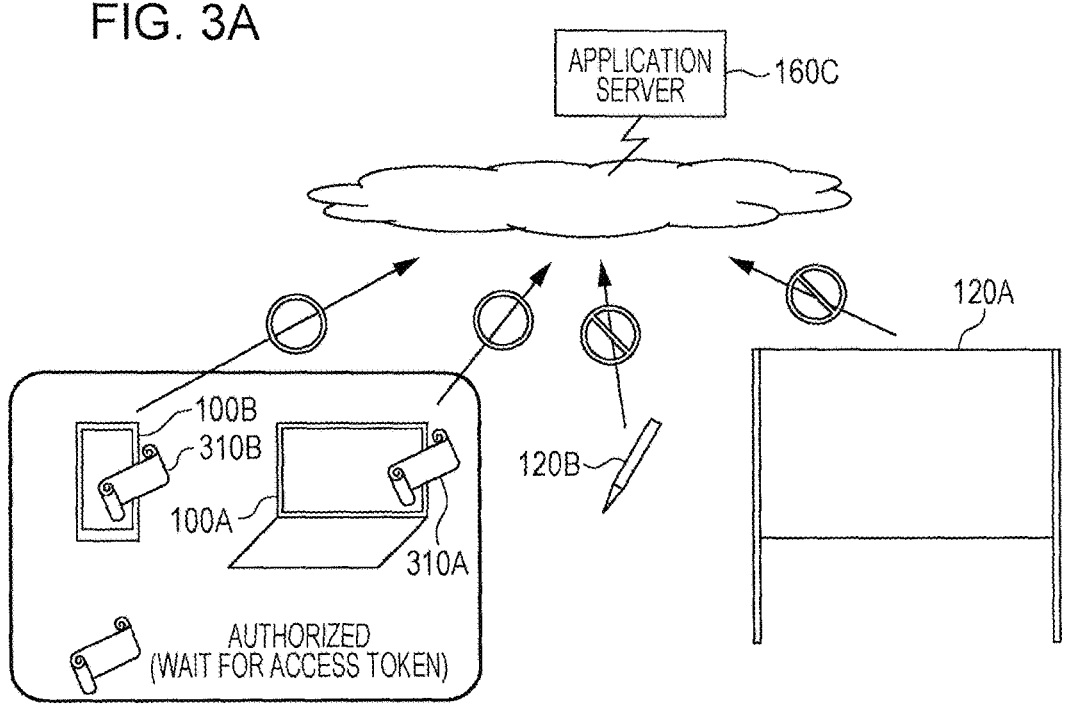
FIGS. 3A and 3B are explanatory illustrations each showing a processing example according to the first exemplary embodiment.

Exemplary embodiments desirable for realizing the invention are described below with reference to the drawings.

First Exemplary Embodiment

FIG. 1 is a conceptual module configuration diagram for a configuration example of the first exemplary embodiment.

A module represents a component, such as software (a computer program) or hardware, which may be generally logically separated. Hence, a module in this exemplary embodiment represents not only a module being a computer program, but also a module being a hardware configuration. Therefore, description in this exemplary embodiment also involves a computer program that causes a computer to function as such a module (a program that causes a computer to execute respective steps, a program that causes a computer to function as respective units, and a program that causes a computer to provide respective functions), a system, and a method. For convenience of description, wordings "store," "cause . . . to store," and other wordings equivalent thereto are used. These wordings represent causing a storage device to store . . . or controlling a storage device to store . . . in the case in which the exemplary embodiment is a computer program. Also, modules may correspond to functions one by one. However, when being mounted or installed, a single module may be formed of a single program, plural modules may be formed of a single program, or a single module may be formed of plural programs. Also, plural modules may be executed by a single computer, or a single module may be executed by plural computers in a distributed or parallel environment. A single module may include another module. Also, "connection" is used for physical connection, and logical connection (for example, transmission and reception of data, an instruction, or reference relationship among data). An expression "predetermined" represents being determined before target processing. The situation includes a situation before processing according to this exemplary embodiment is started, and a situation even after the processing according to this exemplary embodiment is started as long as the situation is before target processing. In other words, the expression "predetermined" is used as being determined in accordance with the condition and state of the current situation, or the condition and state of the previous situation. If there are plural "predetermined values," the values may be different, or two or more values (of course, all the values) may be the same. Also, an expression "if A, do B" is used as "determining whether A or not, and doing B if it is determined as A," unless otherwise the determination whether A or not is not required.

Also, a system or an apparatus includes a case in which a system or an apparatus is formed of plural computers, hardware, plural devices, etc., connected by a communication measure such as a network (including communication connection in a one-to-one correspondence), and a case in which a system or an apparatus is provided by a single computer, hardware, a single device, etc. An "apparatus" and a "system" are used as mutually equivalent words. Of course, a "system" does not include a social "scheme" (social system) that is merely an artificial agreement.

Also, target information is read from a storage device every processing of each module or every processing if plural steps of processing are executed in a module, and after the processing, the processing result is written out to the storage device. Hence, the description of reading the information from the storage device before the processing and writing out the processing result to the storage device after the processing may be occasionally omitted. The storage device in this case may include a hard disk, a random access memory (RAM), an external storage medium, a storage device arranged via a communication line, and a register in a central processing unit (CPU).

In an information processing system according to the first exemplary embodiment, a second device that does not request authorization information requests a server to execute processing on the basis of the authorization information. As shown in the example in FIG. 1, the information processing system includes an authorization share system 155 and an application server 160.

The authorization share system 155 according to this exemplary embodiment includes a proprietary device 100 (an example of a first device), a temporary use device 120 (an example of a second device), and an information processing apparatus 140. These devices and apparatus are connected through a communication line 198. The communication line 198 may be wireless or wired, or a combination of wireless and wired configurations. For example, the communication line 198 may be the Internet, an intranet, or the like, as a communication infrastructure. Also, a communication line that connects the proprietary device 100 with the information processing apparatus 140 or that connects the temporary use device 120 with the information processing apparatus 140 may be different from a communication line that connects the proprietary device 100 with the temporary use device 120. In particular, the proprietary device 100 may be connected with the temporary use device 120 by near field communication (communication including wireless communication base station, including contact communication). Plural temporary use devices 120 may be used for the proprietary device 100.

Processing by the proprietary device 100, temporary use device 120, and information processing apparatus 140 is briefly (or exemplarily) described (the description on the processing is used merely as technical information for easier understanding of the technology).

In accordance with an operation by a user having the proprietary device 100, the authority is temporarily given to the temporary use device 120 that is temporarily used. The temporary use device 120 causes processing with respect to the application server 160 to be executed through the information processing apparatus 140.

Hence, the following processing is executed.

When the proprietary device 100 used by the user receives the authentication by the information processing apparatus 140, the proprietary device 100 receives first authorization information.

The information processing apparatus 140 generates second authorization information on the basis of the first authorization information. The proprietary device 100 distributes the second authorization information to the temporary use device 120.

When the temporary use device 120 transmits data to be used to the information processing apparatus 140, the temporary use device 120 applies the second authorization information to the data to be used.

The proprietary device 100 includes a user interface for requesting the authorization information. The proprietary device 100 may be, for example, a personal computer (PC, including a notebook PC), a tablet terminal, or a mobile terminal device such as a smartphone. The proprietary device 100 is a device including a user interface that may transmit an authentication request and an authorization information generation request to the information processing apparatus 140.

The temporary use device 120 may include a user interface for requesting the authorization information, or the temporary use device 120 may not include the user interface for requesting the authorization information. The temporary use device 120 may be, for example, a pen, a notebook, a whiteboard, or a projector, the device which may make communication and may input and output electronic information (or which may only input or output the information). The temporary use device 120 is a device that is (expected to be) a subject of IoT service. The temporary use device 120 is able to communicate with at least the proprietary device 100. The interface which may not be included in the temporary use device 120 is "the user interface for requesting the authorization information." The temporary use device 120 may include a simple user interface (for example, a single button). Alternatively, the temporary use device 120 may not include any user interface. The temporary use device 120 is a device different from the proprietary device 100.

The proprietary device 100 includes a token acquisition module 105 and an authorization information distribution module 110.

The token acquisition module 105 is connected with a token issue module 145 of the information processing apparatus 140 through the communication line 198. The token acquisition module 105 acquires the first authorization information for executing processing (including an operation) with respect to the application server 160 from the information processing apparatus 140.

The authorization information distribution module 110 is connected with an authorization information reception module 125 of the temporary use device 120 through the communication line 198. The authorization information distribution module 110 transmits the second authorization information to the temporary use device 120 located near the proprietary device 100. The second authorization information may be transmitted in response to an operation by the user of the proprietary device 100, or may be automatically transmitted (for example, when a predetermined program is activated).

The temporary use device 120 includes the authorization information reception module 125 and a use module 130.

The authorization information reception module 125 is connected with the authorization information distribution module 110 of the proprietary device 100 through the communication line 198. The authorization information reception module 125 receives the second authorization information distributed from the proprietary device 100. Accordingly, the authorization information reception module 125 receives information on operation authority to be used by the application server 160, from the proprietary device 100. The authorization information reception module 125 receives the information, for example, by automatic standby using polling or by an operation on demand from the user.

The use module 130 is connected with an alternate module 150 of the information processing apparatus 140 through the communication line 198. The use module 130 transmits the second authorization information and data to be processed to the information processing apparatus 140, for using the function of the application server 160.

The information processing apparatus 140 includes the token issue module 145 and the alternate module 150. The information processing apparatus 140 has a function of access management. In particular, the information processing apparatus 140 manages that the proprietary device 100 and the temporary use device 120 access the application server 160 (the temporary use device 120 uses the function of the application server 160).

The token issue module 145 is connected with the token acquisition module 105 of the proprietary device 100 through the communication line 198, and is connected with a token issue module 165 of the application server 160 through a communication line 199. The token issue module 145 stores a user and authorization information (for example, first authorization information), indicative of processing permitted for the user to execute with respect to the application server 160 on the communication line, in an associated manner. The user in this case is a user who uses the proprietary device 100 and the temporary use device 120. However, the user does not have to be the user who uses the proprietary device 100 and the temporary use device 120 constantly and simultaneously. Also, the temporary use device 120 may be used by another user.

Generation of the first authorization information may be requested to the application server 160. The token issue module 145 may generate the first authorization information.

The token issue module 145 generates second authorization information on the basis of the first authorization information associated with the user who uses the proprietary device 100.

Then, the token issue module 145 transmits the second authorization information to the proprietary device 100. Then, the authorization information distribution module 110 of the proprietary device 100 transmits the second authorization information to the temporary use device 120.

In this case, the "first authorization information" is typically an access token (hereinafter, the first authorization information is also referred to as access token), and is information required for the proprietary device 100 to use the function of the application server 160. For example, the first authorization information may be encrypted account information when the user logs in the proprietary device 100 or another device.

The "second authorization information" (hereinafter, also referred to as slave access token) is authorization information derived and created from the first authorization information, and is information required for the temporary use device 120 (or the user who uses the temporary use device 120) to use the function of the application server 160.

The token issue module 145 may generate the second authorization information in response to that the distance between the proprietary device 100 and the temporary use device 120 becomes smaller than a predetermined distance or equal to or smaller than the predetermined distance. The distance between the proprietary device 100 and the temporary use device 120 may be a distance at which the proprietary device 100 may communicate with the temporary use device 120 by near field communication. In this case, if the acquisition of the second authorization information is requested from the proprietary device 100, it may be determined that the proprietary device 100 may communicate with the temporary use device 120 by near field communication, and the second authorization information may be generated. The distance between the proprietary device 100 and the temporary use device 120 may be calculated by using the positions of the proprietary device 100 and the temporary use device 120 measured by their global positioning system (GPS) functions. Owing to this, the positions of the proprietary device 100 and the temporary use device 120 may be received from the proprietary device 100. The proprietary device 100 may calculate the distance from the positions of the proprietary device 100 and the temporary use device 120, and transmit the distance to the information processing apparatus 140.

The token acquisition module 105 of the proprietary device 100 may request the information processing apparatus 140 to generate the second authorization information in response to that the distance between the proprietary device 100 and the temporary use device 120 becomes smaller than a predetermined distance or equal to or smaller than the predetermined distance.

The token issue module 145 may invalidate the second authorization information in response to that the proprietary device 100 and the temporary use device 120 are separated from each other by a distance larger than the predetermined distance or equal to or larger than the predetermined distance.

The token acquisition module 105 of the proprietary device 100 may request the information processing apparatus 140 to invalidate the second authorization information in response to that the proprietary device 100 and the temporary use device 120 are separated from each other by a distance larger than the predetermined distance or equal to or larger than the predetermined distance.

The alternate module 150 is connected with the use module 130 of the temporary use device 120 through the communication line 198, and is connected with a service provision module 170 of the application server 160 through the communication line 199. In response to a request from the temporary use device 120, the alternate module 150 requests the application server 160 corresponding to the request to execute processing.

The alternate module 150 receives the data and the second authorization information distributed from the temporary use device 120.

The alternate module 150 requests the application server 160 to execute the processing by using the data on the basis of the second authorization information. The expression "on the basis of the second authorization information" in this case corresponds to, for example, extraction of the application server 160 corresponding to the second authorization information. Then, the application server 160 checks the second authorization information, and executes the processing using the data.

The proprietary device 100 may have this function of the alternate module 150. To be specific, the alternate module 150 may receive the data and the second authorization information from the temporary use device 120, and request the application server 160 to execute the processing using the data on the basis of the second authorization information.

The alternate module 150 may request the execution of the processing by transmitting the first authorization information used for generating the second authorization information, and the data to the application server 160. For example, the alternate module 150 may extract the first authorization information corresponding to the second authorization information, and transmit the first authorization information and the data to the application server 160.

The alternate module 150 may request the application server 160, corresponding to the first authorization information, to execute the processing by transmitting the first authorization information and the data to the application server 160. For example, the alternate module 150 may extract the application server 160 corresponding to the first authorization information, and transmit the first authorization information and the data to the application server 160.

The application server 160 includes the token issue module 165 and the service provision module 170. In the example in FIG. 1, the application server 160 includes two application servers (application server A: 160A, application server B: 160B). However, the number of application servers 160 may be one, or three or more.

The token issue module 165 is connected with the token issue module 145 of the information processing apparatus 140 through the communication line 199. The token issue module 165 generates the first authorization information for executing the processing in the application server 160, in response to the request from the information processing apparatus 140. The communication line 199 may be wireless or wired, or a combination of wireless and wired configurations. For example, the communication line 199 may be the Internet, an intranet, or the like, as a communication infrastructure.

The service provision module 170 is connected with the alternate module 150 of the information processing apparatus 140 through the communication line 199. The service provision module 170 executes the processing requested from the information processing apparatus 140. For example, the processing may be translation, storage of data, and other processing. The request includes the first authorization information. The service provision module 170 determines whether or not the first authorization information is generated by the token issue module 165. If it is the first authorization information generated by the token issue module 165, the service provision module 170 executes the processing. If it is different, the service provision module 170 does not execute the processing, and executes error processing (transmission of a message indicative of there is no authorization information, report to an administrator, or other processing).

FIG. 2 is an explanatory illustration showing a system configuration example in which this exemplary embodiment is used.

A proprietary device 100A, a proprietary device 100B, a proprietary device 100C, a temporary use device 120A, a temporary use device 120B, a temporary use device 120C, the information processing apparatus 140, an application server A: 160A, and an application server B: 160B are connected with one another through a communication line 290. The communication line 290 corresponds to the communication line 198 and the communication line 199. As described above, the communication between the proprietary device 100 and the temporary use device 120 may be near field communication. Also, functions of the application server A: 160A and the application server B: 160B may be provided as cloud services.

A combination 210 indicates a case where the two temporary use devices 120 (the temporary use device 120A, the temporary use device 120B) are used with respect to the single proprietary device 100A.

A user of the proprietary device 100A uses the application server A: 160A and the application server B: 160B by using the temporary use device 120A and the temporary use device 120B. Hence, the proprietary device 100A causes the information processing apparatus 140 to generate a slave access token, and distributes the slave access token to the temporary use device 120A and the temporary use device 120B. The temporary use device 120A and the temporary use device 120B use the application server A: 160A and the application server B: 160B by using the slave access token.

A combination 220 indicates a case where the single temporary use device 120C is used by the two proprietary devices 100 (the proprietary device 100B, the proprietary device 100C). This exemplary embodiment corresponds to a second exemplary embodiment described later with reference to FIG. 12 and so forth.

Two users of the proprietary device 100B and the proprietary device 100C use the application server A: 160A and the application server B: 160B by also using the temporary use device 120C. Hence, the proprietary device 100B and the proprietary device 100C cause the information processing apparatus 140 to generate respective slave access tokens, and distribute the slave access tokens to the temporary use device 120C. The temporary use device 120C uses the application server A: 160A and the application server B: 160B by using the slave access tokens.

Figure 3B:
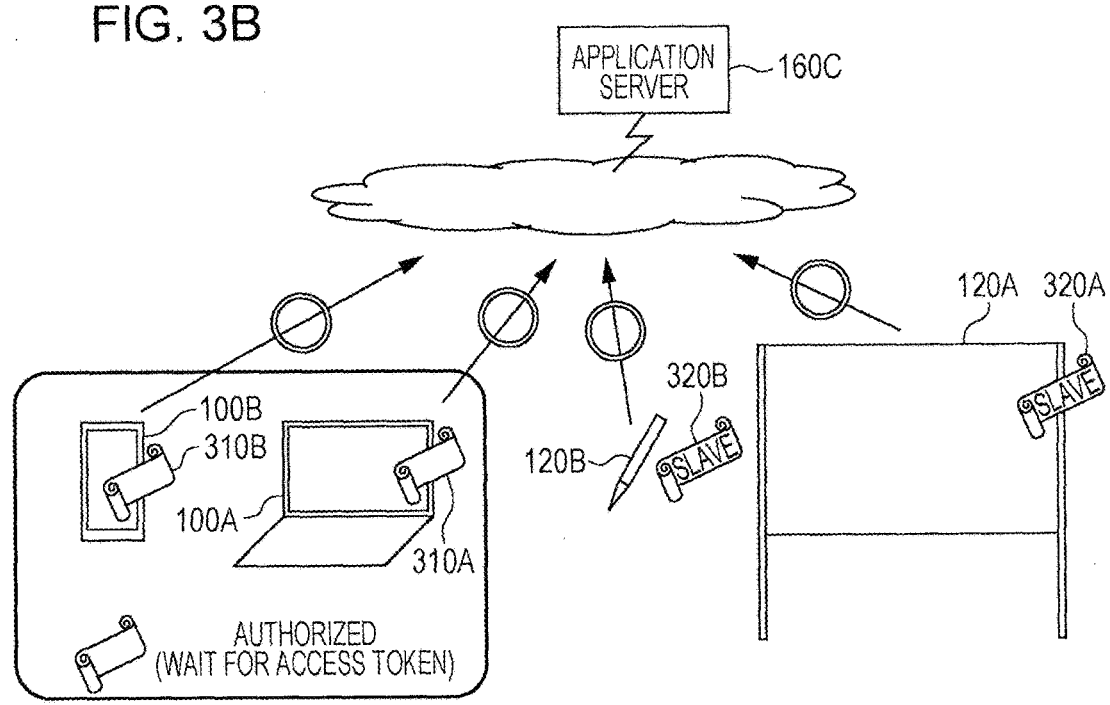

FIGS. 3A and 3B are explanatory illustrations each showing a processing example according to the first exemplary embodiment.

The drawings exemplarily illustrate a notebook PC as the proprietary device 100A, a smartphone as the proprietary device 100B, a whiteboard as the temporary use device 120A, and an electronic pen as the temporary use device 120B. An application server C: 160C provides, for example, a cloud storage service, and the illustrated example is a case where contents are uploaded from the respective devices.

In the example shown in FIG. 3A, the proprietary device 100A and the proprietary device 100B, which are devices authenticated and authorized for the cloud storage service, respectively have an access token 310A and an access token 310B, and hence receive the cloud storage service by the application server C: 160C.

However, if this exemplary embodiment is not used, since the temporary use device 120A and the temporary use device 120B, which are devices not authenticated and not authorized (or which have no authentication function or authorization function), have no access token, the temporary use device 120A or the temporary use device 120B may not be provided with the cloud storage service by the application server C: 160C.

The example shown in FIG. 3B indicates a case using this exemplary embodiment. For example, slave access tokens (a slave access token 320A, a slave access token 320B) are generated on the basis of the access tokens (the access token 310A, the access token 310B) of the authenticated and authorized devices (the proprietary device 100A, the proprietary device 100B), and are distributed to non-authenticated and non-authorized devices (the temporary use device 120A, the temporary use device 120B). Accordingly, the temporary use devices 120A and 120B are provided with the cloud storage service by using the slave access tokens (the slave access token 320A, the slave access token 320B). For example, in this case, data such as a character on paper (trail data) by the temporary use device 120B and a captured image of a board written on the temporary use device 120A are stored in the application server C: 160C.

FIG. 4 is an explanatory illustration showing a processing example according to the first exemplary embodiment.

In step S402, the proprietary device 100B designates an application (the application server 160) and an operation with respect to the information processing apparatus 140.

In step S404, the information processing apparatus 140 distributes an access token (the access token 310B, the slave access token 320B) to the proprietary device 100B.

In step S406, the proprietary device 100B distributes the slave access token 320B to the temporary use device 120B.

In step S408, the user uses the temporary use device 120B.

In step S410, the temporary use device 120B transmits the slave access token 320B and data 410 to be used to the information processing apparatus 140.

In step S412, the information processing apparatus 140 specifies the application (the application server 160) and the operation (processing) from the slave access token 320B received from the temporary use device 120B.

In step S414, the information processing apparatus 140 calls the specified application server 160. To be specific, the information processing apparatus 140 transmits the data 410 and causes the application server 160 to execute processing.

FIG. 5 is a flowchart showing a processing example (a processing example of issuing an access token to the proprietary device 100) according to the first exemplary embodiment.

In step S502, the proprietary device 100 requests the information processing apparatus 140 to acquire an access token. Specifically, data to be transmitted is "(AUTHENTICATION INFORMATION, APPLICATION A, OPERATION X)." For example, the authentication information is "USER ID=U1" and the operation X is "OPERATION ID=P1." The application A is information for specifying the application server 160.

In step S504, the information processing apparatus 140 requests the application server A: 160A to issue the access token. Specifically, data to be transmitted is "(AUTHENTICATION INFORMATION, OPERATION X)".

In step S506, the application server A: 160A executes authentication processing and then issues an access token TA1.

At a time point 562, an access token management table 600 in the application server A: 160A is as shown in an example in FIG. 6. FIG. 6 is an explanatory illustration showing a data structure example of the access token management table 600. The access token management table 600 includes an access token ID column 610, a user ID column 620, an operation ID column 630, and an issue date and time column 640. The access token ID column 610 stores information for uniquely identifying an access token (access token identification (ID)) according to this exemplary embodiment. The user ID column 620 stores information for uniquely identifying a user (user ID) according to this exemplary embodiment. The operation ID column 630 stores information for uniquely identifying an operation (operation ID) according to this exemplary embodiment. The issue date and time column 640 stores the date and time that the access token is issued (year, month, day, hour, minute, second, a unit shorter than the second, or a combination of these).

In step S508, the application server A: 160A replies to the information processing apparatus 140 as being successful, and transmits the access token TA1.

Figures 7, 8:
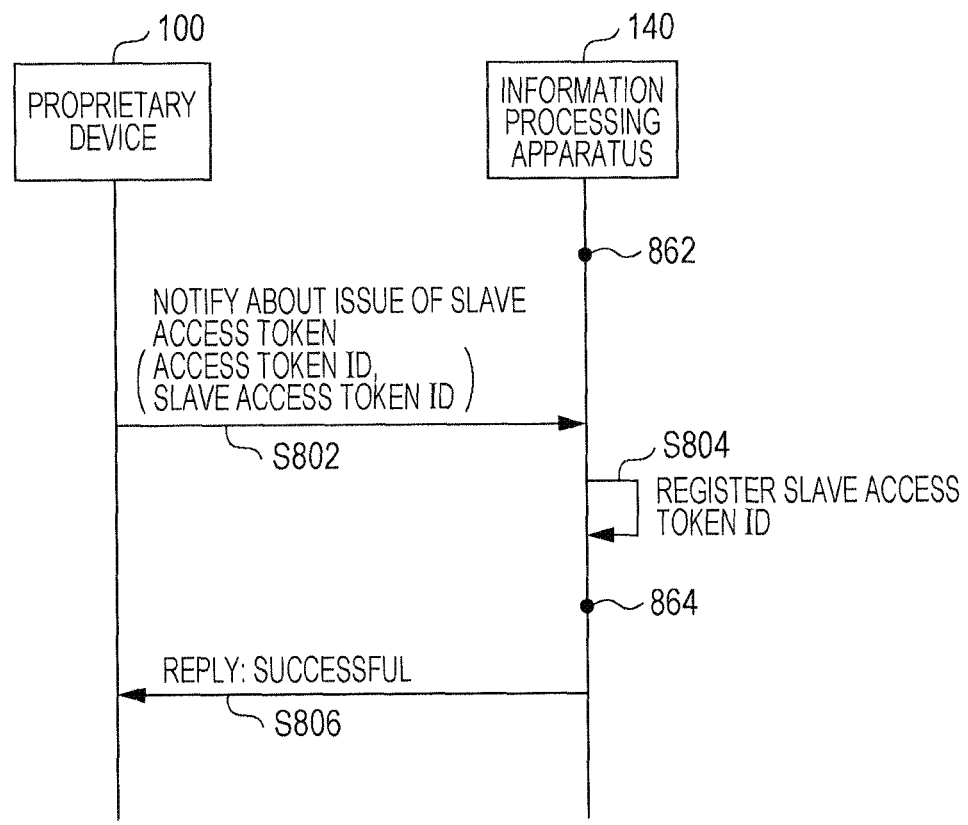
FIG. 7 is an explanatory illustration showing a data structure example of an access token management table.
FIG. 8 is a flowchart showing a processing example according to the first exemplary embodiment.

At a time point 564, an access token management table 700 in the information processing apparatus 140 is as shown in an example in FIG. 7. FIG. 7 is an explanatory illustration showing a data structure example of the access token management table 700. The access token management table 700 is obtained by adding an application column 720 to the access token management table 600 shown in the example in FIG. 6. The access token management table 700 includes an access token ID column 710, the application column 720, a user ID column 730, an operation ID column 740, and an issue date and time column 750. The access token ID column 710 stores an access token ID. The application column 720 stores an application (in this case, information for specifying the application server A: 160A). The user ID column 730 stores a user ID. The operation ID column 740 stores an operation ID. The issue date and time column 750 stores an issue date and time.

In step S510, the information processing apparatus 140 replies to the proprietary device 100 as being successful, and transmits the access token TA1.

In other exemplary embodiment, the slave access token could be created by the proprietary device 100. FIG. 8 is a flowchart showing a processing example (a processing example of issuing a slave access token by the proprietary device 100) according to the exemplary embodiment.

At a time point 862, the access token management table 700 in the information processing apparatus 140 is as shown in the example in FIG. 7. The state at the time point 862 is similar to the state at the time point 564 shown in the example in FIG. 5.

In step S802, the proprietary device 100 notifies the information processing apparatus 140 about issue of a slave access token. Specifically, data to be transmitted is "(ACCESS TOKEN ID, SLAVE ACCESS TOKEN ID)."

In step S804, the information processing apparatus 140 registers the slave access token ID.

At a time point 864, a slave access token management table 900 in the information processing apparatus 140 is as shown in an example in FIG. 9. FIG. 9 is an explanatory illustration showing a data structure example of the slave access token management table 900. The slave access token management table 900 includes a slave access token ID column 910, an access token ID column 920, and an issue date and time column 930. The slave access token ID column 910 stores information for uniquely identifying a slave access token (slave access token ID) according to this exemplary embodiment. The access token ID column 920 stores an access token ID corresponding to the slave access token. The issue date and time column 930 stores the date and time that the slave access token ID is issued.

In step S806, the information processing apparatus 140 replies to the proprietary device 100 as being successful.

FIG. 10 is a flowchart showing a processing example (a processing example of distributing a slave access token) according to the first exemplary embodiment.

In step S1002, the proprietary device 100 starts distribution of authorization information. For example, this step follows an operation by a user.

In step S1004, the temporary use device 120 starts reception of authorization information. For example, this step follows an operation by a user. Any one of the processing in step S1002 and the processing in step S1004 may be started first (as a matter of course, the steps may be executed simultaneously).

In step S1006, the proprietary device 100 distributes a slave access token to the temporary use device 120. Specifically, data to be transmitted is "(SLAVE ACCESS TOKEN ID)."

In step S1008, the temporary use device 120 saves the slave access token.

In step S1010, the temporary use device 120 replies to the proprietary device 100 as being successful.

In step S1012, the proprietary device 100 terminates the distribution of the authorization information.

In step S1014, the temporary use device 120 terminates the reception of the authorization information.

FIG. 11 is a flowchart showing a processing example according to the first exemplary embodiment.

At a time point 1162, an access token management table 700 in the information processing apparatus 140 is as shown in the example of part (a) in FIG. 11. The state at the time point 1162 is similar to the state at the time point 564 shown in the example in FIG. 5.

At a time point 1164, a slave access token management table 900 in the information processing apparatus 140 is as shown in the example of part (b) in FIG. 11. The state at the time point 1164 is similar to the state at the time point 864 shown in the example in FIG. 8.

In step S1102, the temporary use device 120 is used by an operation by a user.

In step S1104, the temporary use device 120 requests the information processing apparatus 140 to execute a service. Specifically, data to be transmitted is "(SLAVE ACCESS TOKEN ID, DATA)." For example, the slave access token ID is "CT1."

In step S1106, the information processing apparatus 140 converts the slave access token into an access token. For example, the information processing apparatus 140 converts "CT1" into "TA1."

In step S1108, the information processing apparatus 140 requests the application server A: 160A to execute an alternate function corresponding to the request for the execution of the service. Specifically, data to be transmitted is "(TA1, DATA)."

At a time point 1166, an access token management table 600 in the application server A: 160A is as shown in an example of part (c) in FIG. 11. The state at the time point 1166 is similar to the state at the time point 562 shown in the example in FIG. 5.

In step S1110, the application server A: 160A checks the access token and executes the service (the service corresponding to the alternate function).

In step S1112, the application server A: 160A transmits an execution result to the information processing apparatus 140.

In step S1114, the information processing apparatus 140 transmits the execution result to the temporary use device 120.

The slave token may be distributed as follows.

Distribution is started when the proprietary device 100 is shifted to the slave token distribution state by the authorization information distribution module 110 and when the temporary use device 120 is shifted to the standby state by the authorization information reception module 125.

The distribution is not started when only one of the states is shifted. Also, any one of the states is not shifted when the other state is shifted and the shift is detected.

In particular, near field communication may be used in an area where high security is needed. For example, the distance required for a "passing-over" operation such as FeliCa (registered trademark) by near field communication (NFC) may be employed.

Processing of invalidating a slave access token may be as follows.

The slave access token is:

(1) invalidated in accordance with an explicit operation by a user with respect to the proprietary device 100, that is, in accordance with an instruction from the proprietary device 100 to the information processing apparatus 140;

(2) invalidated in accordance with an instruction from the temporary use device 120 to the information processing apparatus 140 when a predetermined invalidation time-limit expires, the invalidation time-limit being designated by an operation by a user if required;

(3) invalidated in accordance with an instruction from the proprietary device 100 to the information processing apparatus 140 if it is determined that the proprietary device 100 and the temporary use device 120 are separated from each other by a distance equal to or larger than a predetermined distance, and do not move close to each other again within a predetermined period of time (that is, if the distance does not become smaller than the predetermined distance), the distance and time being designated by an operation by a user if required;

(4) invalidated by the information processing apparatus 140 when the invalidation time-limit is set for the slave access token and the time-limit expires; and (5) invalidated by the information processing apparatus 140 when the limit for the number of times the operation is executed is set and the number exceeds the limit.

Second Exemplary Embodiment

Figure 12:
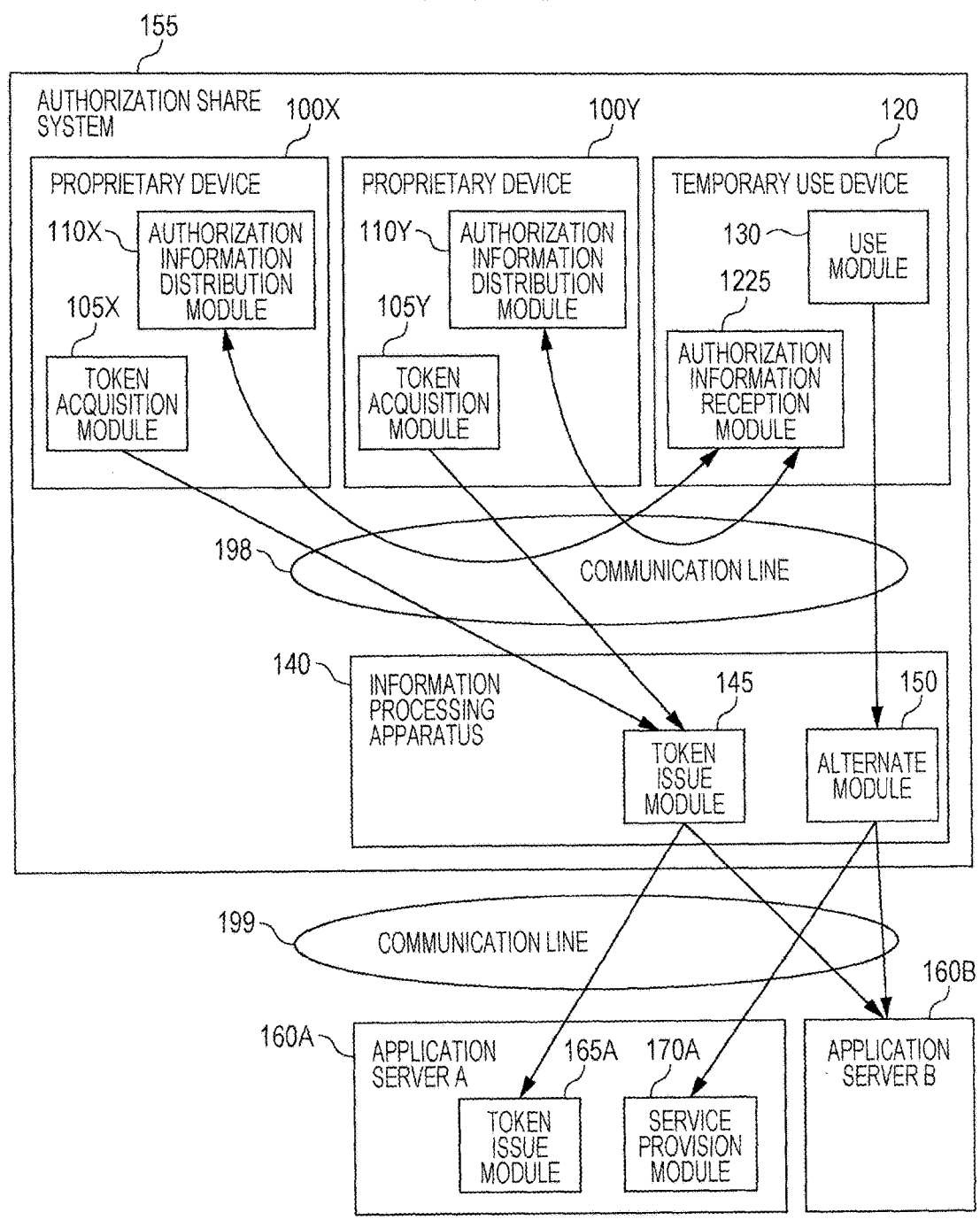
FIG. 12 is a conceptual module configuration diagram for a configuration example of a second exemplary embodiment.

FIG. 12 is a conceptual module configuration diagram for a configuration example of a second exemplary embodiment. The same reference signs are applied to portions of the same kinds as those of the above-described exemplary embodiment, and the redundant description thereof is omitted (this will be applied to the following description).

An authorization share system 155 includes a proprietary device 100X, a proprietary device 100Y, a temporary use device 120, and an information processing apparatus 140.

The proprietary device 100X includes a token acquisition module 105X and an authorization information distribution module 110X.

The proprietary device 100Y includes a token acquisition module 105Y and an authorization information distribution module 110Y.

The temporary use device 120 includes an authorization information reception module 1225 and a use module 130.

The information processing apparatus 140 includes a token issue module 145 and an alternate module 150. The information processing apparatus 140 has a function of access management.

An application server 160 includes a token issue module 165 and a service provision module 170.

The token acquisition module 105X is connected with the token issue module 145 of the information processing apparatus 140 through a communication line 198.

The token acquisition module 105Y is connected with the token issue module 145 of the information processing apparatus 140 through the communication line 198. The token acquisition module 105X and the token acquisition module 105Y have functions equivalent to the token acquisition module 105.

The authorization information distribution module 110X is connected with the authorization information reception module 1225 of the temporary use device 120 through the communication line 198.

The authorization information distribution module 110Y is connected with the authorization information reception module 1225 of the temporary use device 120 through the communication line 198. The authorization information distribution module 110X and the authorization information distribution module 110Y have functions equivalent to the authorization information distribution module 110.

The authorization information reception module 1225 is connected with the authorization information distribution module 110X of the proprietary device 100X and the authorization information distribution module 110Y of the proprietary device 100Y through the communication line 198. The authorization information reception module 1225 may terminate the reception of the second authorization information in accordance with a terminate operation by the user of the temporary use device 120. This example includes plural proprietary devices 100, and is able to handle a case where the number of users who use the temporary use device 120 is limited. For example, an operation may be performed with a toggle that switches the state between start and end using a single button.

The use module 130 is connected with the alternate module 150 of the information processing apparatus 140 through the communication line 198.

The token issue module 145 is connected with the token acquisition module 105 of the proprietary device 100 through the communication line 198, and is connected with the token issue module 165 of the application server 160 through a communication line 199.

The alternate module 150 is connected with the use module 130 of the temporary use device 120 through the communication line 198, and is connected with the service provision module 170 of the application server 160 through the communication line 199.

The token issue module 165 is connected with the token issue module 145 of the information processing apparatus 140 through the communication line 199.

The service provision module 170 is connected with the alternate module 150 of the information processing apparatus 140 through the communication line 199.

Figure 13:
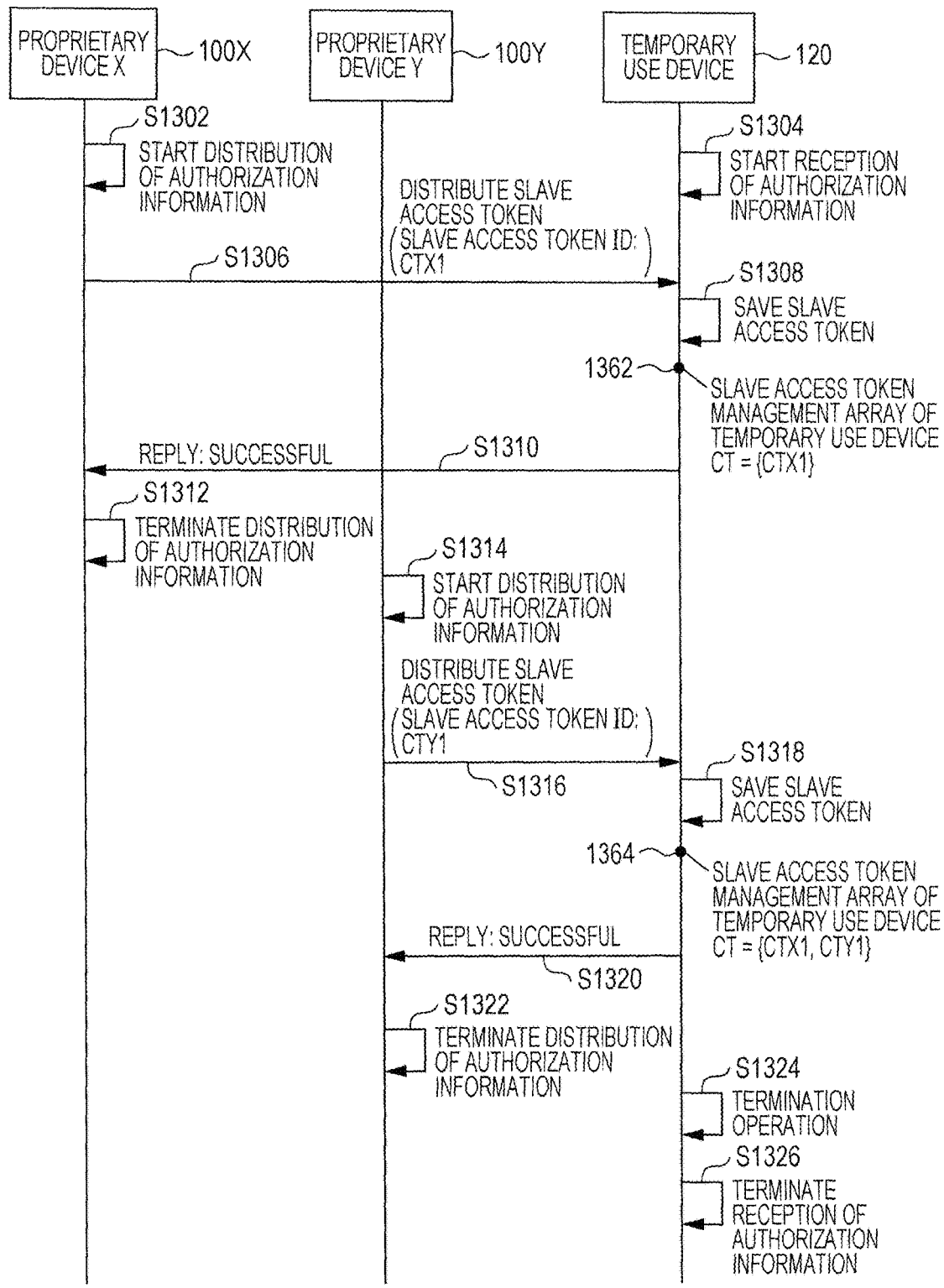
FIG. 13 is a flowchart showing a processing example according to the second exemplary embodiment.

FIG. 13 is a flowchart showing a processing example (a processing example of receiving plural slave access tokens) according to the second exemplary embodiment.

In step S1302, the proprietary device 100X starts distribution of authorization information.

In step S1304, the temporary use device 120 starts reception of authorization information.

In step S1306, the proprietary device 100X distributes a slave access token to the temporary use device 120. Specifically, data to be transmitted is "(SLAVE ACCESS TOKEN ID: CTX1)."

In step S1308, the temporary use device 120 saves the slave access token.

At a time point 1362, a slave access token management array of the temporary use device 120 is CT={CTX1}.

In step S1310, the temporary use device 120 replies to the proprietary device 100X as being successful.

In step S1312, the proprietary device 100X terminates the distribution of the authorization information.

In step S1314, the proprietary device 100Y starts distribution of authorization information.

In step S1316, the proprietary device 100Y distributes a slave access token to the temporary use device 120. Specifically, data to be transmitted is "(SLAVE ACCESS TOKEN ID: CTY1)."

In step S1318, the temporary use device 120 saves the slave access token.

At a time point 1364, a slave access token management array of the temporary use device 120 is CT={CTX1, CTY1}.

In step S1320, the temporary use device 120 replies to the proprietary device 100Y as being successful.

In step S1322, the proprietary device 100Y terminates the distribution of the authorization information.

In step S1324, the temporary use device 120 executes a termination operation.

In step S1326, the temporary use device 120 terminates the reception of the authorization information.

In the temporary use device 120, in the period from step S1304 to step S1324, the temporary use device 120 receives the distribution of the slave access tokens from the plural proprietary devices 100.

Third Exemplary Embodiment

Figure 14:
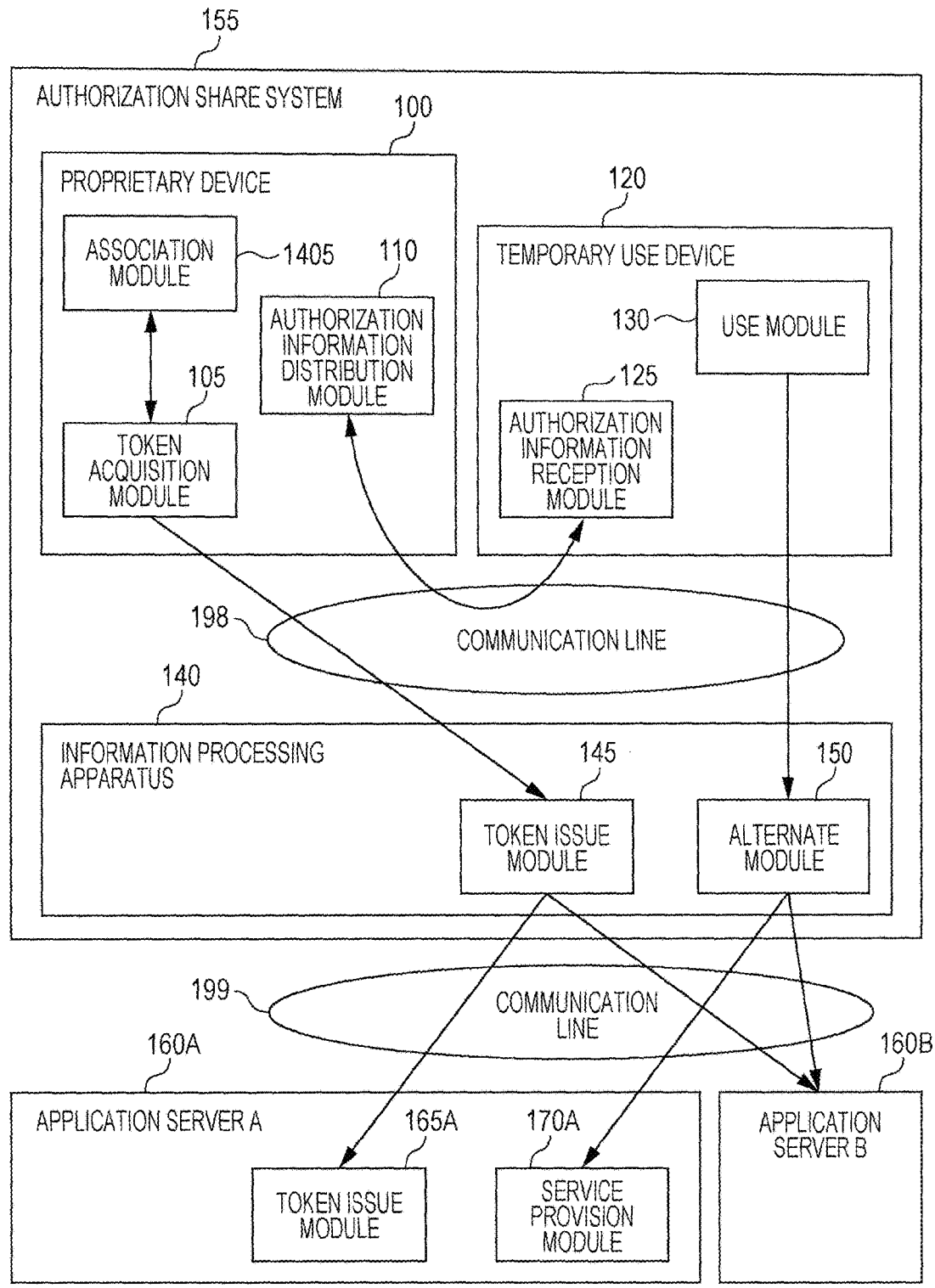
FIG. 14 is a conceptual module configuration diagram for a configuration example of a third exemplary embodiment.

FIG. 14 is a conceptual module configuration diagram for a configuration example of a third exemplary embodiment.

An authorization share system 155 includes a proprietary device 100, a temporary use device 120, and an information processing apparatus 140.

The proprietary device 100 includes a token acquisition module 105, an authorization information distribution module 110, and an association module 1405.

The temporary use device 120 includes an authorization information reception module 125 and a use module 130.

The information processing apparatus 140 includes a token issue module 145 and an alternate module 150. The information processing apparatus 140 has a function of access management.

An application server 160 includes a token issue module 165 and a service provision module 170.

The token acquisition module 105 is connected with the association module 1405, and connected with the token issue module 145 of the information processing apparatus 140 through a communication line 198.

The authorization information distribution module 110 is connected with the authorization information reception module 125 of the temporary use device 120 through the communication line 198.

The association module 1405 is connected with the token acquisition module 105. The association module 1405 stores software in the proprietary device 100 and first authorization information in an associated manner. The authorization information distribution module 110 may start distribution of second authorization information to the temporary use device 120 in response to activation of the software in the proprietary device 100.

The authorization information reception module 125 is connected with the authorization information distribution module 110 of the proprietary device 100 through the communication line 198.

The use module 130 is connected with the alternate module 150 of the information processing apparatus 140 through the communication line 198.

The token issue module 145 is connected with the token acquisition module 105 of the proprietary device 100 through the communication line 198, and is connected with the token issue module 165 of the application server 160 through a communication line 199.

The alternate module 150 is connected with the use module 130 of the temporary use device 120 through the communication line 198, and is connected with the service provision module 170 of the application server 160 through the communication line 199.

The token issue module 165 is connected with the token issue module 145 of the information processing apparatus 140 through the communication line 199.

The service provision module 170 is connected with the alternate module 150 of the information processing apparatus 140 through the communication line 199.

Figure 15:
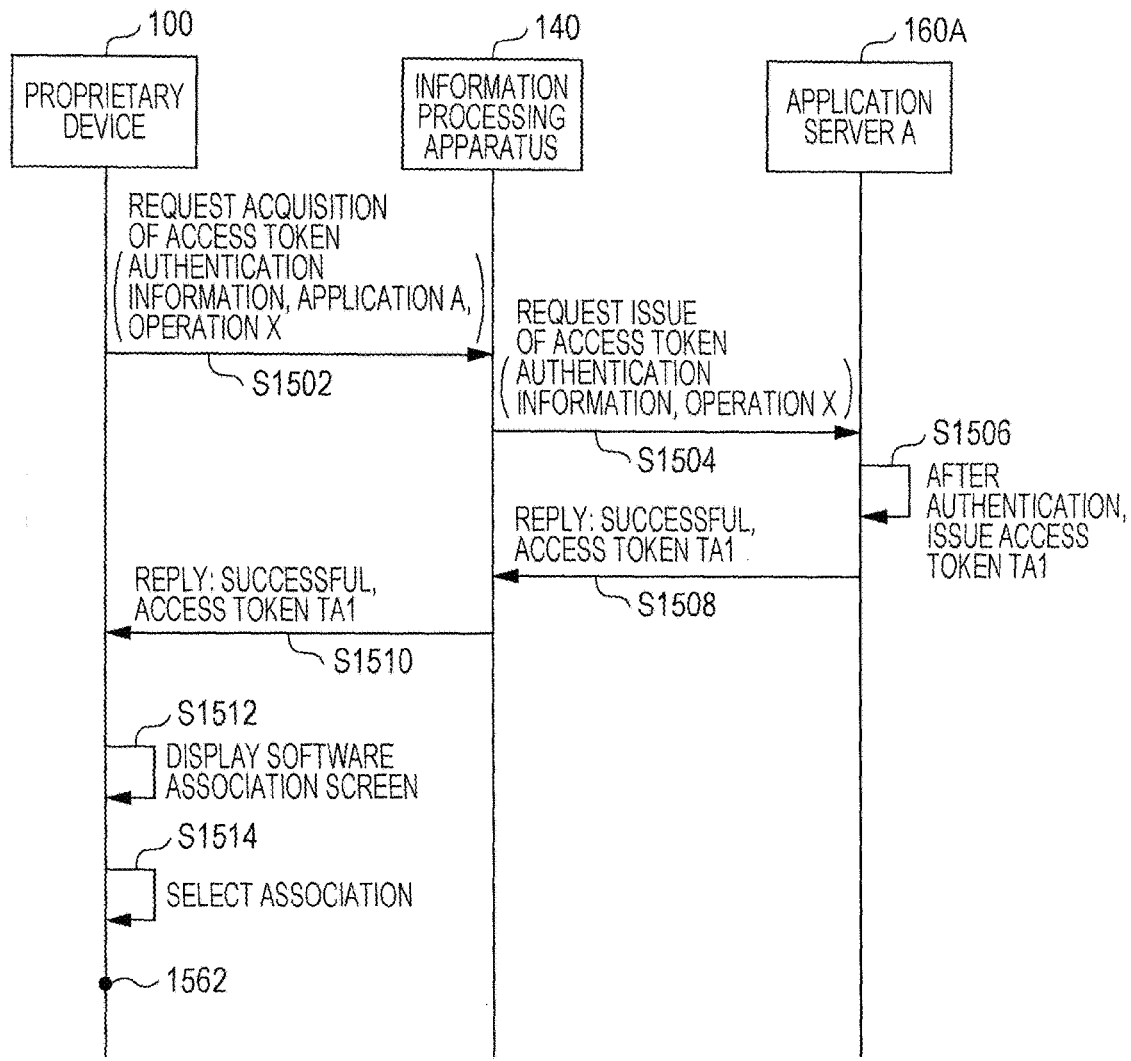
FIG. 15 is a flowchart showing a processing example according to the third exemplary embodiment.

FIG. 15 is a flowchart showing a processing example (a processing example of association with software) according to the third exemplary embodiment.

In step S1502, the proprietary device 100 requests the information processing apparatus 140 to acquire an access token. Specifically, data to be transmitted is "(AUTHENTICATION INFORMATION, APPLICATION A, OPERATION X)."

In step S1504, the information processing apparatus 140 requests the application server A: 160A to issue the access token. Specifically, data to be transmitted is "(AUTHENTICATION INFORMATION, OPERATION X)".

In step S1506, the application server A: 160A executes authentication processing and then issues an access token TA1.

In step S1508, the application server A: 160A replies to the information processing apparatus 140 as being successful, and transmits the access token TA1.

In step S1510, the information processing apparatus 140 replies to the proprietary device 100 as being successful, and transmits the access token TA1.

In step S1512, the proprietary device 100 displays a software association screen.

In step S1514, the proprietary device 100 selects association.

Figure 16:
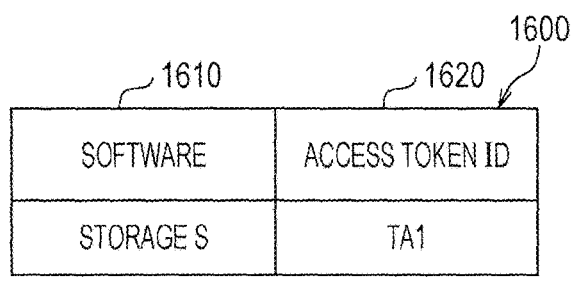
FIG. 16 is an explanatory illustration showing a data structure example of an association table for software and access token.

At a time point 1562, an association table 1600 for software and access token in the proprietary device 100 is as shown in an example in FIG. 16. FIG. 16 is an explanatory illustration showing a data structure example of the association table 1600 for software and access token. The association table 1600 for software and access token includes a software column 1610 and an access token ID column 1620. The software column 1610 stores software. The access token ID column 1620 stores an access token ID corresponding to the software.

Figures 17, 18:
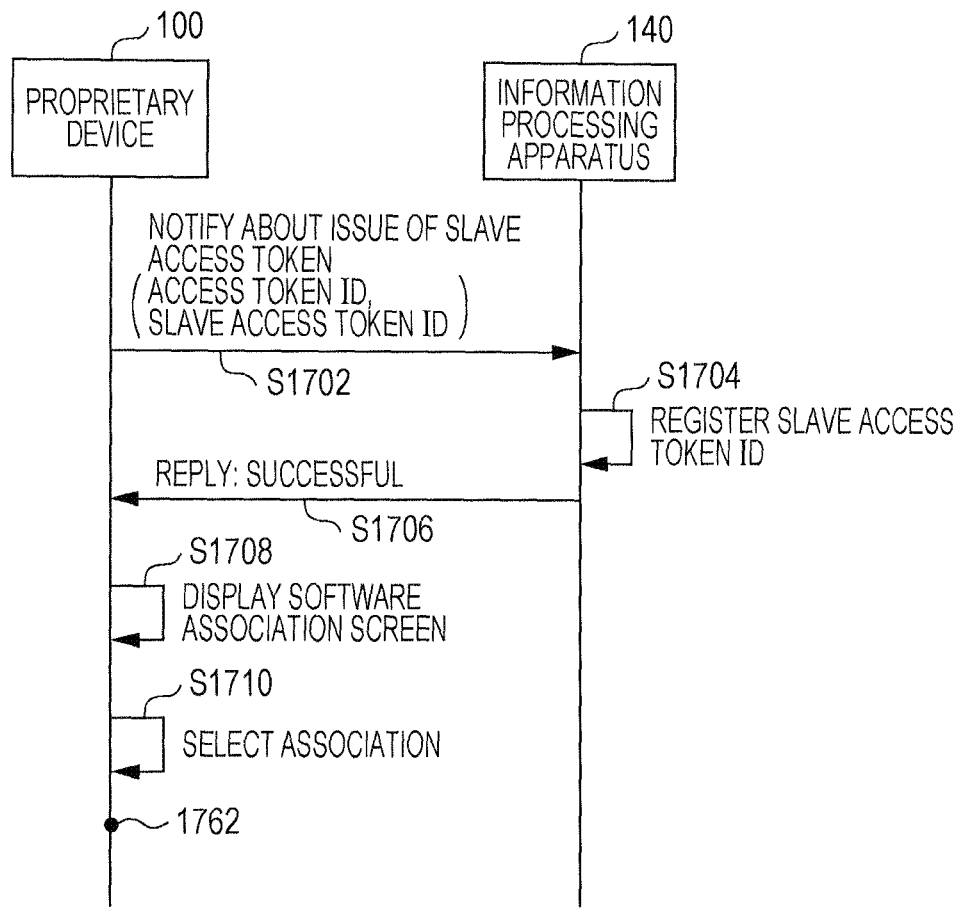
FIG. 17 is a flowchart showing a processing example according to the third exemplary embodiment.
FIG. 18 is an explanatory illustration showing a data structure example of an association table for software, access token, and slave access token.

FIG. 17 is a flowchart showing a processing example according to the third exemplary embodiment.

In step S1702, the proprietary device 100 notifies the information processing apparatus 140 about issue of a slave access token. Specifically, data to be transmitted is "(ACCESS TOKEN ID, SLAVE ACCESS TOKEN ID)."

In step S1704, the information processing apparatus 140 registers the slave access token ID.

In step S1706, the information processing apparatus 140 replies to the proprietary device 100 as being successful.

In step S1708, the proprietary device 100 displays a software association screen.

In step S1710, the proprietary device 100 selects association.

At a time point 1762, an association table 1800 for software, access token, and slave access token in the proprietary device 100 is as shown in an example in FIG. 18. FIG. 18 is an explanatory illustration showing a data structure example of the association table 1800 for software, access token, and slave access token. The association table 1800 for software, access token, and slave access token is obtained by adding a slave access token ID column 1830 to the association table 1600 for software and access token shown in the example in FIG. 16.

The association table 1800 for software, access token, and slave access token includes a software column 1810, an access token ID column 1820, and the slave access token ID column 1830. The software column 1810 stores software. The access token ID column 1820 stores an access token ID corresponding to the software. The slave access token ID column 1830 stores a slave access token ID corresponding to the software.

Figure 19:
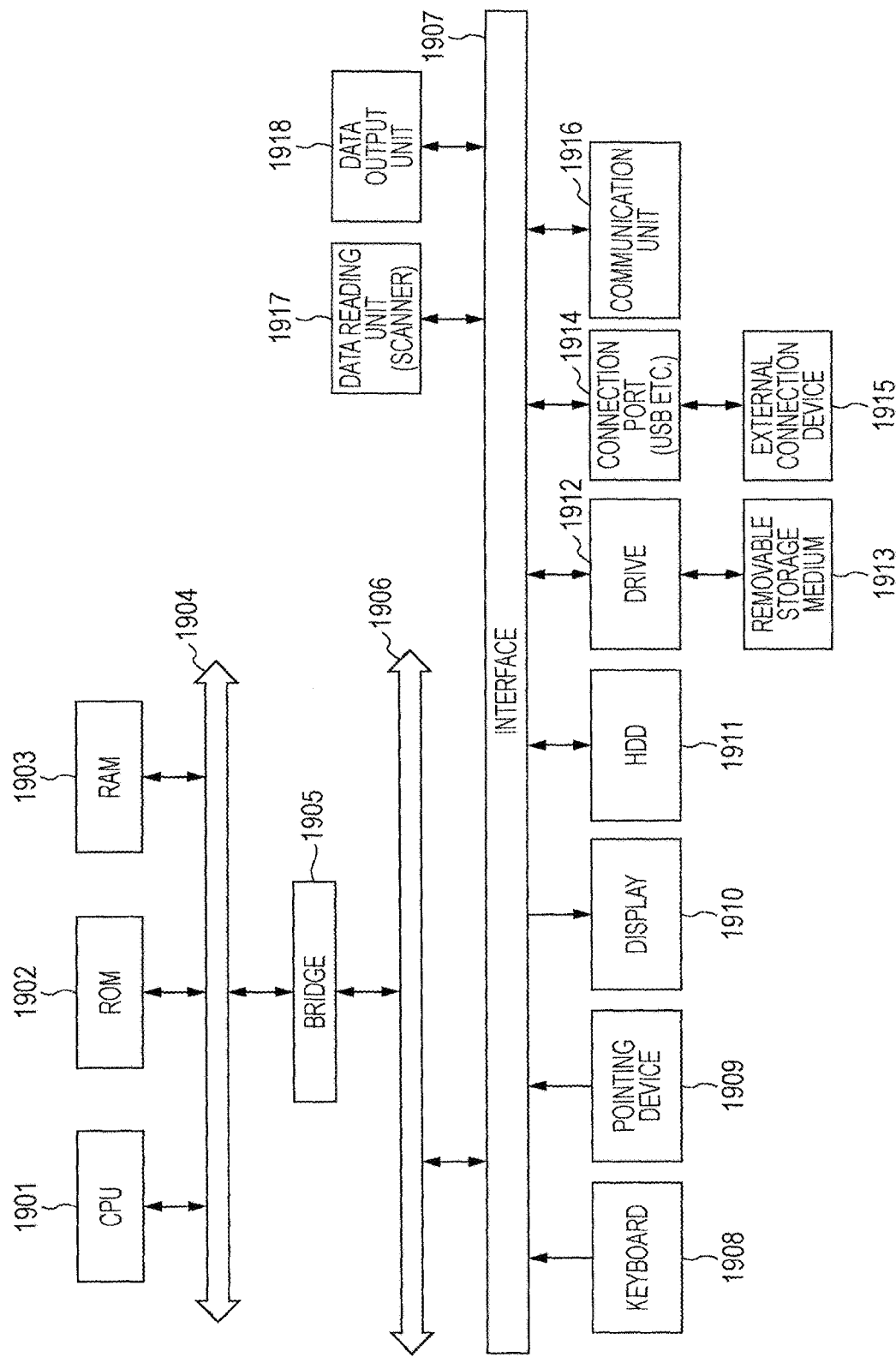
FIG. 19 is a block diagram showing a hardware configuration example of a computer that realizes any of the exemplary embodiments.

A hardware configuration example of an information processing apparatus according to this exemplary embodiment is described with reference to FIG. 19. The configuration shown in FIG. 19 is formed of, for example, a personal computer (PC), and is a hardware configuration example including a data reading unit 1917 such as a scanner, and a data output unit 1918 such as a printer.

A central processing unit (CPU) 1901 is a controller that executes processing according to a computer program having written therein execution sequences of the aforementioned various modules described in the exemplary embodiments, that is, the token acquisition module 105, the authorization information distribution module 110, the authorization information reception module 125, the use module 130, the token issue module 145, the alternate module 150, the token issue module 165, the service provision module 170, etc.

A read only memory (ROM) 1902 stores a program, an operation parameter, etc., used by the CPU 1901. A random access memory (RAM) 1903 stores a program used during the execution by the CPU 1901, a parameter that is properly changed during the execution, etc. The CPU 1901, the ROM 1902, and the RAM 1903 are mutually connected through a host bus 1904 formed of, for example, a CPU bus.

The host bus 1904 is connected with an external bus 1906 such as a peripheral component interconnect/interface (PCI) bus through a bridge 1905.

A keyboard 1908 and a pointing device 1909 such as a mouse are devices that are operated by an operator. A display 1910 is a liquid crystal display device, a cathode ray tube (CRT), or the like, and displays various information as text and image information. Alternatively, the display 1910 may be a touch screen or the like including both the functions of the pointing device 1909 and the display 1910.

A hard disk drive (HDD) 1911 includes a hard disk (or flash memory etc.) therein, drives the hard disk, and causes the hard disk to record or reproduce a program executed by the CPU 1901 and information. The hard disk stores an access token and data required for processing. Further, the hard disk stores various data and various computer programs.

A drive 1912 reads data or a program recorded in a mounted removable storage medium 1913, such as a magnetic disk, an optical disc, a magneto-optical disk, or a semiconductor memory, and supplies the data or program to the RAM 1903 connected through an interface 1907, the external bus 1906, the bridge 1905, and the host bus 1904. The removable storage medium 1913 may be also used as a data recording area.

A connection port 1914 is a port that connects an external connection device 1915, and has a connection portion, such as USB or IEEE 1394. The connection port 1914 is connected with the CPU 1901 and other units through the interface 1907, the external bus 1906, the bridge 1905, the host bus 1904, etc. A communication unit 1916 is connected with a communication line and executes data communication processing with an external device. The data reading unit 1917 is, for example, a scanner, and executes reading processing for a document. The data output unit 1918 is, for example, a printer, and executes output processing for document data.

The hardware configuration of the information processing apparatus shown in FIG. 19 is merely a configuration example. The configuration of any of the exemplary embodiments is not limited to the configuration shown in FIG. 19, and may be any configuration as long as the modules described in each of the exemplary embodiments may be executed. For example, a portion of the modules may be formed of dedicated hardware (for example, application specific integrated circuit (ASIC) or the like), a portion of the modules may be arranged in an external system and may be connected through a communication line, and further the system shown in FIG. 19 may be multiple systems mutually connected through a communication line and the multiple systems may operate in a collaborative manner. Alternatively, in particular, a portion of the modules may be arranged in any of a mobile information communication apparatus (including a mobile phone, a smartphone, a mobile device, a wearable computer, and so forth), a home information appliance, a robot, a copier, a facsimile, a scanner, a printer, and a multiple-function device (an image processing apparatus having at least two functions of a scanner, a printer, a copier, and a facsimile), instead of a personal computer.

The above-described exemplary embodiments may be combined (for example, including adding a module in a certain exemplary embodiment to another exemplary embodiment, exchanging a module in a certain exemplary embodiment, and so forth).

Also, in the comparison processing in the description for the exemplary embodiments, "equal to or larger than," "equal to or smaller than," "larger than," and "smaller (less) than" may be respectively, "larger than," "smaller (less) than," "equal to or larger than," and "equal to or smaller than" unless a contradiction arises in the combination.

The above-described program may be stored in a storage medium and provided. Alternatively, the program may be provided by a communication measure. In this case, for example, the above-described program may be interpreted as an aspect of the invention of "a computer-readable medium storing a program."

"The computer-readable medium storing the program" represents a computer-readable medium storing a program, the medium which is used for, for example, installation, execution, and distribution of the program.

For example, the storage medium may include a digital versatile disk (DVD), particularly, "DVD-R, DVD-RW, DVD-RAM, and the like" complying with the standard formulated by the DVD forum, "DVD+R, DVD+RW, and the like" complying with the standard formulated as DVD+RW; a compact disc (CD), particularly, a compact disc read only memory (CD-ROM), a compact disc recordable (CD-R), a compact disc rewritable (CD-RW), and the like; a Blu-ray (registered trademark) disc; a magneto-optical disk (MO); a flexible disk (FD); a magnetic tape; a hard disk; a read only memory (ROM); an electrically erasable programmable ROM (EEPROM, registered trademark); a flash memory; a random access memory (RAM); a secure digital (SD) memory card; and the like.

The entirety or a portion of the above-described program may be recorded in the storage medium, and may be stored and distributed. Also, the above-described program or a portion of the program may be transmitted by using a wired network, a wireless communication network, a transmission medium with a combination of the wired network and the wireless communication network, used for a local area network (LAN), a metropolitan area network (MAN), a wide area network (WAN), the Internet, an intranet, an extranet, or the like; or may be carried on a carrier wave.

Further, the program may be the entirety or a portion of another program, or may be recorded in a storage medium together with a different program. Alternatively, the program may be divided and recorded in plural recording media. Also, the program may be recorded in any form, for example, a compressed form or an encrypted form, as long as the program may be restored.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:
a memory that stores a user and authorization information, indicative of processing permitted for the user to execute with respect to a server on a communication line, in an associated manner;
at least one processor configured to:
generate a first token comprising first authorization information in response to receiving a first request from a first device to allow the first device to be authorized with the information processing system;
generate a second token comprising second authorization information based on the first authorization information and based on a request from the first device instead of a second device near the first device, the second authorization information being used in authorizing the second device to interact with the information processing system and to cause the information processing system to request a server to execute processing;
wherein the first device comprises a user interface for requesting authorization information, and the second device does not include a user interface for requesting authorization information;
transmit the second authorization information to the first device, which then forwards the second authorization information to the second device;
receive data along with the second authorization information from the second device; and
transmit a request to the server so that the server execute processing using the received data from the second device.

2. The information processing system according to claim 1, wherein the first processor is further configured to request the execution of the processing by transmitting the first authorization information, used for the generation of the second authorization information, and the data to the server.

3. The information processing system according to claim 2, wherein the first processor is further configured to request the execution of the processing by transmitting the first authorization information and the data to a server associated with the first authorization information.

4. The information processing system according to claim 1, wherein the first processor is further configured to generate the second authorization information in response to that a distance between the first device and the second device becomes smaller than a predetermined distance or equal to or smaller than the predetermined distance.

5. The information processing system according to claim 1, wherein the first processor is further configured to invalidate the second authorization information in response to that the first device and the second device are separated from each other by a distance larger than a predetermined distance or equal to or larger than the predetermined distance.

6. An information processing apparatus comprising:
   a memory that stores a user and authorization information, indicative of processing permitted for the user to execute with respect to a server on a communication line, in an associated manner;
   a processor configured to:
      generate a first token comprising first authorization information in response to receiving a first request from a first device to allow the first device to be authorized with the information processing system;
      generate a second token comprising second authorization information based on the first authorization information and based on a request from the first device instead of a second device near the first device, the second authorization information being used in authorizing the second device to interact with the information processing system and to cause the information processing system to request a server to execute processing;
   wherein the first device comprises a user interface for requesting authorization information, and the second device does not include a user interface for requesting authorization information;
      transmits the second authorization information to the first device, wherein receive data along with the second authorization information from a second device different from the first device; and
      request to the server so that the server executes processing using the received data from the second device.

7. A non-transitory computer readable medium storing a program causing a computer to execute a process for information processing, the process comprising:
   storing a user and authorization information, indicative of processing permitted for the user to execute with respect to a server on a communication line, in an associated manner;
   generating a first token comprising first authorization information in response to receiving a first request from a first device to allow the first device to be authorized with the information processing system;
   generating a second token comprising second authorization information based on the first authorization information and based on a request from the first device instead of a second device near the first device, the second authorization information being used in authorizing the second device to interact with the information processing system and to cause the information processing system to request a server to execute processing;
   wherein the first device comprises a user interface for requesting authorization information, and the second device does not include a user interface for requesting authorization information;
   transmitting the second authorization information to the first device;
   receiving data along with the second authorization information from a second device different from the first device; and
   requesting the server to execute processing using the received data from the second device.

8. An image processing method comprising:
   storing a user and authorization information, indicative of processing permitted for the user to execute with respect to a server on a communication line, in an associated manner;
   generating a first token comprising first authorization information in response to receiving a first request from a first device to allow the first device to be authorized with the information processing system;
   generating a second token comprising second authorization information based on the first authorization information and based on a request from the first device instead of a second device near the first device, the second authorization information being used in authorizing the second device to interact with the information processing system and to cause the information processing system to request a server to execute processing;
   wherein the first device comprises a user interface for requesting authorization information, and the second device does not include a user interface for requesting authorization information;
   transmitting the second authorization information to the first device;
   receiving data along with the second authorization information from a second device different from the first device; and
   requesting the server to execute processing using the received data from the second device.

* * * * *